(12) United States Patent
Xu et al.

(10) Patent No.: US 12,096,403 B2
(45) Date of Patent: Sep. 17, 2024

(54) RESOURCE SET CONFIGURATION METHOD, TERMINAL, NETWORK DEVICE, AND STORAGE MEDIUM

(71) Applicant: GUANGDONG OPPO MOBILE TELECOMMUNICATIONS CORP., LTD., Dongguan (CN)

(72) Inventors: Jing Xu, Dongguan (CN); Yanan Lin, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 290 days.

(21) Appl. No.: 17/699,874

(22) Filed: Mar. 21, 2022

(65) Prior Publication Data

US 2022/0210770 A1 Jun. 30, 2022

Related U.S. Application Data

(63) Continuation of application No. PCT/CN2020/076735, filed on Feb. 26, 2020.

(30) Foreign Application Priority Data

Nov. 8, 2019 (CN) .......................... 201911089723.2

(51) Int. Cl.
*H04W 72/02* (2009.01)
*H04W 72/044* (2023.01)
*H04W 72/23* (2023.01)

(52) U.S. Cl.
CPC ......... *H04W 72/02* (2013.01); *H04W 72/044* (2013.01); *H04W 72/23* (2023.01)

(58) Field of Classification Search
CPC .... H04W 72/02; H04W 72/044; H04W 72/20
See application file for complete search history.

(56) References Cited

U.S. PATENT DOCUMENTS

| 2019/0223085 | A1 | 7/2019 | Wang et al. |
| 2019/0349973 | A1* | 11/2019 | Yang ...................... H04W 72/23 |
| 2020/0068599 | A1* | 2/2020 | Yang ...................... H04L 5/0055 |
| 2021/0368493 | A1 | 11/2021 | Lin |

FOREIGN PATENT DOCUMENTS

| CN | 105794137 A | 7/2016 |
| CN | 109644467 A | 4/2019 |
| CN | 110035511 A | 7/2019 |
| CN | 110035528 A | 7/2019 |
| CN | 110324896 A | 10/2019 |
| CN | 110351840 A | 10/2019 |

(Continued)

OTHER PUBLICATIONS

Notice of Allowance issued in corresponding European application No. 20885961.1, mailed Jun. 26, 2023.

(Continued)

*Primary Examiner* — Brian P Cox
(74) *Attorney, Agent, or Firm* — BAYES PLLC (57) ABSTRACT

A method for configuring a resource set is applied to a terminal and includes: receiving first configuration information; and configuring a first PUCCH resource set and a second PUCCH resource set according to the first configuration information.

11 Claims, 3 Drawing Sheets

```
┌─────────────────────────────────────────────────┐
│ Determine the number of bits used by the first │
│ PUCCH resource indicator according to the      │ ─── 301
│ first DCI format, and determine the number of   │
│ bits used by the second PUCCH resource          │
│ indicator according to the second DCI format   │
└─────────────────────────────────────────────────┘
                        │
                        ▼
┌─────────────────────────────────────────────────┐
│ Configure the first PUCCH resource set          │
│ according to the number of bits used by the    │ ─── 302
│ first PUCCH resource indicator, and configure  │
│ the second PUCCH resource set according to the │
│ number of bits used by the second PUCCH        │
│ resource indicator                              │
└─────────────────────────────────────────────────┘
```

(56) References Cited

FOREIGN PATENT DOCUMENTS

| WO | 2019153311 A1 | 8/2019 |
|---|---|---|
| WO | 2019217696 A1 | 11/2019 |

OTHER PUBLICATIONS

First Office Action issued in corresponding Chinese application No. 202210521520.1, mailed Jun. 8, 2023.
International Search Report issued in corresponding International Application No. PCT/CN2020/076735, mailed Jul. 22, 2020, 30 pages.
Written Opinion of the International Searching Authority issued in corresponding International Application No. PCT/CN2020/076735, mailed Jul. 22, 2020, 12 pages.
"Enhancements on Multi-TRP and Multi-panel Transmission", Agenda item: 7.2.8.2, Source: ZTE, 3GPP TSG RAN WG1 #97 R1-1906236, Reno, USA, May 13-17, 2019, 14 pages.
"Summary of offline discussions for PUCCH resource allocation until 13th Oct.", Agenda Item: 7.3.2.4, Source: OPPO, 3GPP TSG RAN WG1 Meeting 90bis R1-1719168, Prague, CZ, Oct. 9-13, 2017, 9 pages.
First Office Action issued in corresponding Indian application No. 202227018974, mailed Aug. 23, 2022.
Extended European Search Report issued in corresponding European application No. 20885961.1, mailed Aug. 31, 2022.
"Final Report of 3GPP TSG RAN WG1 #99 v1.0.0", Source: MCC Support, 3GPP TSG RAN WG1 Meeting #100-e, R1-2000151, e-Meeting, Feb. 24-Mar. 6, 2020, 163 pages.

* cited by examiner

RESOURCE SET CONFIGURATION METHOD, TERMINAL, NETWORK DEVICE, AND STORAGE MEDIUM

CROSS-REFERENCE TO RELATED APPLICATION

This application is a continuation of International Application No. PCT/CN2020/076735, filed Feb. 26, 2020, which claims priority to Chinese patent application No. 201911089723.2, filed on Nov. 8, 2019, the contents of which are incorporated herein by reference in their entirety.

TECHNICAL FIELD

Embodiments of the application relate to the field of communication technology, and in particular, to a method, a terminal, a network device, and a storage medium for configuring a resource set.

BACKGROUND

Generally, a configurable size of the PUCCH resource indicator (0 or 1 or 2 or 3 bits) is specified in the communication protocol, and used for a new DCI format for DL scheduling. It can be seen that the new DCI format in the current communication protocol has a different number of bits in the PUCCH Resource indicator from other DCI formats (for example, DCI format 1_0, DCI format 0_1). In other words, as the size configuration of the PUCCH resource indicator is supported, the range indicated by the PUCCH Resource indicator may be different, and accordingly, there may be multiple PUCCH resource sets indicated based on the PUCCH resource indicators.

PUCCH Resource indicators of different sizes may be configured with multiple different PUCCH resource sets, respectively. However, it is only supported currently for the terminal on how to configure a PUCCH resource set corresponding to DCI format 1_1 and DCI format 1_0 through high-level signaling, but it is not specified for the terminal on how to configure multiple corresponding PUCCH resource sets based on the PUCCH Resource indicator with the configurable size.

SUMMARY

Embodiments of the application provide a method, a terminal, a network device, and a storage medium for configuring a resource set. Based on a PUCCH resource indicator with a configurable size, the terminal is able to configure multiple PUCCH resource sets corresponding to different numbers of bits.

The technical solutions of the embodiments of the application are implemented as follows.

According to a first aspect, the embodiments of the application provide a method for configuring a resource set, being applied to a terminal and including:
  receiving first configuration information; and
  configuring a first PUCCH resource set and a second PUCCH resource set according to the first configuration information.

According to a second aspect, the embodiments of the application provide a method for configuring a resource set, being applied to a network device and including:
  sending first configuration information to a terminal, causing the terminal to configure a first PUCCH resource set and a second PUCCH resource set according to the first configuration information.

According to a third aspect, the embodiments of the application provide a terminal, including a receiving part and a configuration part, wherein
  the receiving part is configured to receive first configuration information; and
  the configuration part is configured to configure a first PUCCH resource set and a second PUCCH resource set according to the first configuration information.

According to a fourth aspect, the embodiments of the application provide a network device, including a sending part, wherein
  the sending part is configured to send first configuration information to a terminal, causing the terminal to configure a first PUCCH resource set and a second PUCCH resource set according to the first configuration information.

According to a fifth aspect, the embodiments of the application provide a terminal, including a processor and a memory storing instructions executable by the processor, wherein the instructions are used for, when being executed by the processor, implementing the method for configuring the resource set as described above.

According to a sixth aspect, the embodiments of the application provide a network device, including a processor and a memory storing instructions executable by the processor, wherein the instructions are used for, when being executed by the processor, implementing the method for configuring the resource set as described above.

According to a seventh aspect, the embodiments of the application provide a computer-readable storage medium, storing a program thereon and being applied to a terminal, wherein the program is used for, when being executed by a processor, implementing the method for configuring the resource set as described above.

According to an eighth aspect, the embodiments of the application provide a computer-readable storage medium, storing a program thereon and being applied to a terminal, wherein the program is used for, when being executed by a processor, implementing the method for configuring the resource set as described above.

The embodiments of the application provide a method, a terminal, a network device, and a storage medium for configuring a resource set, in which the terminal receives the first configuration information, and configures the first PUCCH resource set and the second PUCCH resource set according to the first configuration information. In other words, according to the embodiments of the application, the terminal is able to configure the first PUCCH resource set and the second PUCCH resource based on the first configuration information as received, thereby achieving configuration of multiple resource sets based on supporting of the configurable size of PUCCH resource indicator proposed by the protocol. That is to say, based on the PUCCH resource indicator with the configurable size, the terminal is able to configure multiple PUCCH resource sets corresponding to different numbers of bits.

DETAILED DESCRIPTION

The technical solutions in some embodiments of the application will be clearly and completely described below in conjunction with the drawings in some embodiments of the application. It may be understood that the specific embodiments described here are only used to explain the related application, but not to limit the application.

In addition, it should be noted that, for ease of description, only the parts related to the relevant application are shown in the drawings.

5GNR (5G New Radio) is a global 5G standard based on a new air interface design based on Orthogonal Frequency Division Multiplexing (OFDM), and is also a very important basis for the next generation of cellular mobile technology. 5G NR has greatly expanded the spectrum range. The Long Term Evolution (LTE) system only supports frequency bands below 3 GHz, and NR is extended to below 6 GHz and millimeter waves 24.25-52.6 GHz. Spectrum resources are the cornerstone of all wireless communications. A larger frequency range means that operators are more likely to find available frequency resources to deploy NR. Different spectrum ranges correspond to different delay expansion, Doppler frequency shift, and phase noise characteristics. In view of this, NR introduces multiple sets of parameters (parameter sets) when defining OFDM signal parameters to flexibly support different spectrum ranges.

In addition, medium and high frequency (especially millimeter wave) signals with abundant frequency resources will suffer severe attenuation during propagation, which limits the network coverage. To this end, NR further introduces advanced multi-antenna transmitting and receiving technologies to increase coverage. At the same time, through uplink and downlink decoupling, low frequency and high frequency work together, the advantages of good coverage at low frequency and large capacity at high frequency are fully combined.

Downlink Control Information (DCI) has multiple formats, used to transmit different control information, and is carried by the Physical Downlink Control Channel (PDCCH). Herein, the DCI carried in the PDCCH includes resource allocation and other control information on one or more user equipment (UE). In LTE, uplink and downlink resource scheduling information are all carried by PDCCH. Generally speaking, there may be multiple PDCCHs in one subframe. The UE needs to demodulate the DCI in the PDCCH first, and then may demodulate its own PDSCH (including broadcast messages, paging, UE data, and the like) at the corresponding resource location.

The number of symbols occupied by the PDCCH in a subframe in LTE is determined by the Control Format Indicator (CFI) defined in the Physical Control Format Indicator Channel (PCFICH). The UE may further read the PCFICH to acknowledge the number of symbols occupied by control channels such as PDCCH. Symbols occupied by PDCCH include, in addition to PDCCH, PCFICH, Physical Hybrid ARQ Indicator Channel (PHICH), RS, and the like. The content of the PCFICH has been demodulated, the distribution of the PHICH is determined by the Physical Downlink Shared Channel (PDSCH), and the distribution of the RS depends on the number of antenna ports broadcast in the PBCH.

Different DCI information may have different purposes. For example, there are DCI for allocating downlink resource block (RB) resources, DCI for allocating uplink RB resources, DCI for adjustment of uplink power control, and DCI specifically for downlink dual-stream space division multiplexing. The protocol classifies these DCIs and distinguishes them with different DCI formats.

In the R9 version of the protocol, a total of the following types of DCI are defined: DCI0, DCI1, DCI1A, DCI1B, DCI1C, DCI1D, DCI2, DCI2A, DCI2B, DCI3, DCI3A. Among them, DCI0, DCI3, and DCI3A are DCI types related to uplink PUSCH or PUCCH, and DCI1, DCI1A, DCI1B, DCI1C, DCI1D, DCI2, DCI2A, and DCI2B are DCI types for downlink PDSCH. Herein, uplink DCI mainly indicates uplink PUSCH transmission, including DCI format 0_0 and DCI format 0_1.

Format 1 is used for the terminal's uplink transmission of scheduling request, while the base station side only needs to detect whether there is such transmission. Format 1 is transmitted on the resource configured to Schedule Request by the system L3 signaling.

Format 1a/1b is used for the terminal's uplink transmission of ACK/NAK (1 bit or 2 bits), and is transmitted on the PUCCH ACK/NAK resource corresponding to the downlink PDCCH CCE.

Format 2 is used to send uplink channel quality indicator (CQI) feedback (20 bits after encoding). After UE-specific scrambling, the data undergoes Quadrature Phase Shift Keying (QPSK) modulation.

Format 2a is used to send uplink CQI feedback (20 bits after encoding) plus 1 bit Acknowledge character (ACK)/Negative Acknowledgment (NAK) information, and undergoes Binary Phase Shift Keying (BPSK) modulation.

Format 2b is used to send uplink CQI feedback (20 bits after encoding) plus 2-bit ACK/NAK information, and undergoes QPSK modulation.

Generally, a configurable size of the PUCCH resource indicator (0 or 1 or 2 or 3 bits) is specified in the communication protocol, and used for a new DCI format for DL scheduling. It should be noted that the new DCI format in the current communication protocol has a different number of bits in the PUCCH Resource indicator from other DCI formats (for example, DCI format 1_0, DCI format 0_1). In other words, as the size configuration of the PUCCH resource indicator is supported, the range indicated by the PUCCH Resource indicator may be different, and accordingly, there may be different PUCCH resource sets indicated based on the PUCCH resource indicators.

PUCCH Resource indicators of different sizes may be configured with multiple different PUCCH resource sets, respectively. However, it is only supported currently for the terminal on how to configure a PUCCH resource set corresponding to DCI format 1_1 and DCI format 1_0 through high-level signaling, but it is not specified for the terminal on how to configure multiple corresponding PUCCH resource sets based on the PUCCH Resource indicator with the configurable size.

The technical solutions in some embodiments of the application will be clearly and completely described below in conjunction with the drawings in some embodiments of the application.

Figure 1:
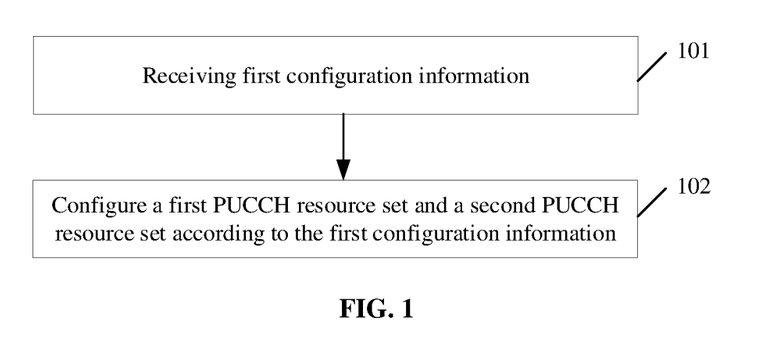
FIG. 1 is a first schematic diagram of the implementation process of the method for configuring resource set.

Some embodiments of the application provide a method for configuring a resource set, which is applied to a terminal. FIG. 1 is a schematic diagram of the implementation process of the method for configuring a resource set. As shown in FIG. 1, the method for configuring a resource set by a terminal may include the following steps.

In step 101, first configuration information is received.

In some embodiments of the application, the terminal may first receive the first configuration information sent by the network side.

It should be noted that in some embodiments of the application, the first configuration information sent by the network side received by the terminal may be used for configuring the PUCCH resource set. Specifically, the terminal may configure at least one PUCCH resource set based on the first configuration information, with each PUCCH resource set including at least one PUCCH resource.

It is understandable that in some embodiments of the application, the current protocol proposes to support the configurable size of the PUCCH resource indicator (0 or 1 or 2 or 3 bits). It can be seen that the new DCI format has a different number of bits in the PUCCH Resource indicator from other DCI formats (for example, DCI format 1_0, DCI format 0_1). In other words, as the size configuration of the PUCCH resource indicator is supported, the range indicated by the PUCCH Resource indicator may be different, and accordingly, there may be multiple PUCCH resource sets indicated based on the PUCCH resource indicators. That is to say, PUCCH Resource indicators of different sizes may be configured with multiple different PUCCH resource sets correspondingly.

Further, in some embodiments of the application, the first configuration information may include PUCCH-Config, where PUCCH-Config is configuration signaling used for configuring the PUCCH resource set. Specifically, in some embodiments of the application, one PUCCH-Config includes at least one PUCCH resource set.

It may be understood that, in some embodiments of the application, the terminal may be any device that has communication and storage functions and is provided with a touch screen, for example, tablet computers, mobile phones, e-readers, remote controls, personal computers (PCs), notebook computers, in-vehicle devices, Internet TVs, wearable devices and the like.

Further, in some embodiments of the application, in addition to receiving the first configuration information sent by the network side, the terminal may also receive second configuration information.

It should be noted that, in some embodiments of the application, the second configuration information may be used for configuring the number of bits of the PUCCH resource indicator field in the DCI.

Further, in some embodiments of the application, the first configuration information received by the terminal may include first sub-configuration information and second sub-configuration information; wherein, the first sub-configuration information is used for configuring at least one PUCCH resource set, and the second sub-configuration information is used for configuring at least one PUCCH resource set.

Further, in some embodiments of the application, the first configuration information received by the terminal may include third sub-configuration information and fourth sub-configuration information; wherein, the third sub-configuration information is used for configuring PUCCH resources in the first PUCCH resource set, and the fourth sub-configuration information is used for configuring PUCCH resources in the second PUCCH resource set.

In step 102, the first PUCCH resource set and the second PUCCH resource set are configured according to the first configuration information.

In some embodiments of the application, after receiving the first configuration information, the terminal may configure the first PUCCH resource set and the second PUCCH resource set according to the first configuration information.

Further, in some embodiments of the application, after obtaining the first configuration information, the terminal may configure and obtain multiple PUCCH resource sets corresponding to the first configuration information in different ways based on the first configuration information, that is, the configuration obtains the first configuration information. A PUCCH resource set and a second PUCCH resource set.

It should be noted that, in some embodiments of the application, when the terminal configures the first PUCCH resource set and the second PUCCH resource set according to the first configuration information, the first PUCCH resource set may be configured to include all PUCCH resources in each PUCCH resource set of the at least one PUCCH resource set, and at the same time, the second PUCCH resource set may be configured to include part or all of the PUCCH resources in each PUCCH resource set.

Further, in some embodiments of the application, after receiving the second configuration information, when configuring the second PUCCH resource set according to the second configuration information, since the second configuration information is used for configuring the number of bits of the PUCCH resource indicator field in the DCI, the terminal may configure, according to the number of bits of the PUCCH resource indicator field, the second PUCCH resource set to include part or all of the PUCCH resources in each PUCCH resource set.

Exemplarily, the terminal may configure resource sets A, B, and C, where resource set A includes resource 1, resource 2, and resource 3, resource set B includes resource 4 and resource 5, and resource set C includes resource 6, resource 7, and resource 8. If the number of bits of the PUCCH resource indicator field in the DCI, which is configured by the second configuration information received by the terminal, is 1, that is, it may indicate a maximum of 2 resources, then the second PUCCH resource set configured by the terminal according to the second configuration information includes resource 1 and resource 2 in resource set A, resource 4 and resource 5 in resource set B, and resource 6 and resource 7 in resource set C.

It should be noted that, in some embodiments of the application, when the terminal configures the first PUCCH resource set and the second PUCCH resource set according to the first configuration information, the first PUCCH resource set may be configured to include N PUCCH resources in each PUCCH resource set of the at least one PUCCH resource set, where N is a positive integer. At the same time, the second PUCCH resource set may be configured to include PUCCH resources in each PUCCH resource set other than the N PUCCH resources.

It is understandable that in some embodiments of the application, N is determined based on the number of bits of the PUCCH resource indicator field in the DCI.

Exemplarily, the terminal may configure resource sets A, B, and C, where resource set A includes resource 1, resource 2, resource 3, and resource 4, and resource set B includes resource 5, resource 6, and resource 7, and resource set C includes resource 8, resource 9 and resource 10. If the number of bits of the PUCCH resource indicator field in the DCI, which is configured by the second configuration information received by the terminal, is 1, then it may be determined that $N=2^1=2$. Accordingly, the first PUCCH resource set configured by the terminal includes resource 1 and resource 2 in resource set A, resource 5 and resource 6 in resource set B, resource 8 and resource 9 in resource set C; and the second PUCCH resource set configured by the terminal includes resource 3 and resource 4 in resource set A, resource 7 in resource set B, and resource 10 in resource set C.

In other words, in some embodiments of the application, when the terminal configures the first PUCCH resource set and the second PUCCH resource set in different ways, it may specifically include a joint configuration of the first PUCCH resource set and the second PUCCH resource set, and may also include independent configurations of the first PUCCH resource set and the second PUCCH resource set.

It is understandable that, in some embodiments of the application, for the first PUCCH resource set and the second PUCCH resource set obtained by the terminal through independent configurations, the first PUCCH resource set and the second PUCCH resource set are configured independently of each other without a fixed relationship.

For example, the first PUCCH resource set configured by the terminal in the above example includes resource 1 and resource 2 in resource set A, resource 5 and resource 6 in resource set B, and resource 8 and resource 9 in resource set C; and the second PUCCH resource set configured by the terminal in the above example includes resource 3 and resource 4 in resource set A, resource 7 in resource set B, and resource 10 in resource set C.

It is understandable that, in some embodiments of the application, for the joint configuration mode, the terminal may receive at least two PUCCH resource sets, for example, receive the first PUCCH resource set and the second PUCCH resource set, where the first PUCCH resource set is a subset of the second PUCCH resource set. Specifically, the terminal may first receive a set of PUCCH-Config. The PUCCH-Config includes at least one PUCCH resource set, with each PUCCH resource set including at least one PUCCH resource. Based on the above at least one PUCCH resource set, the second PUCCH resource set obtained by the terminal may include all of the at least one PUCCH resource set and all the PUCCH resources included in all of the at least one PUCCH resource set; while the first PUCCH resource set obtained by the terminal may include all of the at least one PUCCH resource set and all or part of the PUCCH resources included in all of the at least one PUCCH resource set.

It should be noted that, in some embodiments of the application, when acquiring the first PUCCH resource set, part or all of the PUCCH resources included in all of the at least one PUCCH resource set in the first PUCCH resource set depend on configuration of the second configuration information. In other words, in some embodiments of the application, whether the first PUCCH resource set includes partial PUCCH resources included in all of the at least one PUCCH resource set, or all PUCCH resources included in all of the at least one PUCCH resource set, is determined by the terminal according to the second configuration information.

Further, in some embodiments of the application, if the first PUCCH resource set includes partial PUCCH resources included in all of at least one PUCCH resource set, then these partial PUCCH resources are the previous PUCCH resources in each PUCCH resource set.

For example, the second PUCCH resource set configured by the terminal in the above example includes resource 1 and resource 2 in resource set A, resource 4 and resource 5 in resource set B, and resource 6 and resource 7 in resource set C.

Further, in some embodiments of the application, when the terminal configures the first PUCCH resource set and the second PUCCH resource set according to the first configuration information, the first PUCCH resource set may be configured to include all PUCCH resources in the at least one PUCCH resource set configured by the first sub-configuration information, and the second PUCCH resource set may be configured to include all PUCCH resources in at least one PUCCH resource set configured by the second sub-configuration information.

Exemplarily, in some embodiments of the application, for the independent configuration mode, the terminal may receive the first DCI format (first sub-configuration information) and the second DCI format (second sub-configuration information), and then configure the first PUCCH resource set corresponding to the number of bits used by a first PUCCH resource indicator of the first DCI format, and configure the second PUCCH resource set corresponding to the number of bits used by a second PUCCH resource indicator of the second DCI format.

Further, in some embodiments of the application, the terminal may also configure PUCCH resources in the first PUCCH resource set by using the third sub-configuration information, and configure PUCCH resources in the second PUCCH resource set by using the fourth sub-configuration information.

Exemplarily, in some embodiments of the application, for the independent configuration mode, the terminal may configure two independent resourceSetToAddModList/resourceSetToReleaseList or two independent resourceToAddModList/resourceToReleaseList, that is, the third sub-configuration information and the fourth sub-configuration information, and then further configure them as the first PUCCH resource set and the second PUCCH resource set.

Exemplarily, in some embodiments of the application, for the independent configuration mode, the terminal may also configure a target PUCCH resource set, and then configure the first PUCCH resource set and the second PUCCH resource set based on different elements in the target PUCCH resource set.

For example, the first PUCCH resource set corresponds to the 1st to $2^n$-th PUCCH resources in each PUCCH resource set of the target PUCCH resource set, and the second PUCCH resource set corresponds to the $2^{(n+1)}$-th to $2^{(n+m)}$-th PUCCH resources in each PUCCH resource set of the target PUCCH resource set.

Further, in some embodiments of the application, m and n are integers. Exemplarily, m may be the first number of bits of the first PUCCH resource indicator corresponding to the first DCI format; n may be the second number of bits of the first PUCCH resource indicator corresponding to the first DCI format.

Based on the method for configuring resource set proposed in step 101 to step 102, the terminal may configure multiple resource sets by using the first configuration information as received. Specifically, the terminal may jointly configure the first PUCCH resource set and the second PUCCH resource set based on the first configuration information, and may also independently configure the first PUCCH resource set and the second PUCCH resource set based on the first configuration information.

In some embodiments of the application, further, in practical applications, the PUCCH resource indicator may also be extended to other fields mentioned in the protocol, such as the Band Width Part (BWP) field, Physical Downlink Shared Channel (PDSCH), Hybrid Automatic Repeat reQuest (HARQ), feedback timing indicator (PDSCH-to- HARQ) field, beta offset indicator field, downlink assignment index (DAI), transmission configuration indication (TCI) field, Hybrid Automatic Repeat request process number (HARQ) field.

In some embodiments of the application, further, in practical applications, the PUCCH resource set may also be extended to other sets mentioned in the protocol, such as configured grant configuration set, BWP set, feedback timing length (feedback timing) set, beta offset set, DAI set, and TCI state set. The determination method thereof may be the same as the determination method of the first PUCCH resource set or the second PUCCH resource set in the application.

In some embodiments of the application, further, in actual applications, the first PUCCH resource set may also be extended to other sets mentioned in the protocol, such as the first configured grant configuration set, the first BWP set, the first feedback timing set, the first beta offset set, the first DAI set, and the first TCI state set. The determination method thereof may the same as the first PUCCH resource set in the application.

In some embodiments of the application, further, in actual applications, the second PUCCH resource set may also be extended to other sets mentioned in the protocol, such as the second configured grant configuration set, the second BWP set, the second feedback timing set, the second beta offset set, the second DAI set, and the second TCI state set. The determination method thereof may the same as the second PUCCH resource set in the application.

The embodiments of the application provide a method for configuring a resource set, in which the terminal receives the first configuration information, and configures the first PUCCH resource set and the second PUCCH resource set according to the first configuration information. In other words, according to the embodiments of the application, the terminal is able to configure the first PUCCH resource set and the second PUCCH resource based on the first configuration information as received, thereby achieving configuration of multiple resource sets based on supporting of the configurable size of PUCCH resource indicator proposed by the protocol. That is to say, based on the PUCCH resource indicator with the configurable size, the terminal is able to configure multiple PUCCH resource sets corresponding to different numbers of bits.

Figure 2:
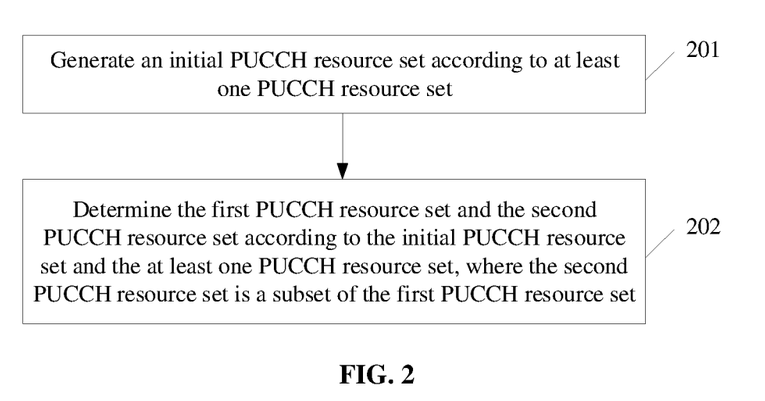
FIG. 2 is a second schematic diagram of the implementation process of the method for configuring resource set.

Based on the above-mentioned embodiments, in some other embodiments of the application, FIG. 2 is a second schematic diagram of the implementation process of the method for configuring resource set. As shown in FIG. 2, the method performed by the terminal for configuring the first PUCCH resource set and the second PUCCH resource set according to the first configuration information may include the following steps.

In step 201, an initial PUCCH resource set is generated according to at least one PUCCH resource set.

In some embodiments of the application, after obtaining the first configuration information, the terminal may generate the initial PUCCH resource set according to at least one PUCCH resource set included in the PUCCH-Config.

It should be noted that in some embodiments of the application, one PUCCH-Config may include at least one PUCCH resource set. After receiving the first configuration information, the terminal may further generate the initial PUCCH resource set by using the at least one PUCCH resource set included in the PUCCH-Config. Specifically, the terminal may determine all PUCCH resources in all of the at least one PUCCH resource set as the initial PUCCH resource set.

It is understandable that, in some embodiments of the application, when generating the initial PUCCH resource set according to at least one PUCCH resource set, the terminal may first determine at least one set of PUCCH resources corresponding to the at least one PUCCH resource set. Specifically, in some embodiments of the application, one set of PUCCH resources correspond to one PUCCH resource set; then the at least one set of PUCCH resources may be determined as the initial PUCCH resource set. In other words, the terminal may determine all PUCCH resources in all PUCCH resource sets, and then determine the all PUCCH resources as the initial PUCCH resource set.

Further, in some embodiments of the application, when the terminal determines at least one set of PUCCH resources corresponding to at least one PUCCH resource set, if an indicator of one PUCCH resource set in the at least one PUCCH resource set is 0, one set of PUCCH resources corresponding to such PUCCH resource set includes i PUCCH resources, where i is an integer greater than or equal to 8 and less than or equal to 32. In other words, for a PUCCH resource set indicated as 0, the PUCCH resource set includes i PUCCH resources.

Further, in some embodiments of the application, when the terminal determines at least one set of PUCCH resources corresponding to at least one PUCCH resource set, if an indicator of one PUCCH resource set in the at least one PUCCH resource set is 2, 3, or 4, one set of PUCCH resources corresponding to such PUCCH resource set includes 8 PUCCH resources. In other words, for a PUCCH resource set indicated as 2, 3, or 4, the PUCCH resource set includes 8 PUCCH resources.

In step 202, the first PUCCH resource set and the second PUCCH resource set are determined according to the initial PUCCH resource set and the at least one PUCCH resource set, where the second PUCCH resource set is a subset of the first PUCCH resource set.

In some embodiments of the application, after generating the initial PUCCH resource set according to at least one PUCCH resource set, the terminal may determine the first PUCCH resource set and the second PUCCH resource set according to the initial PUCCH resource set and the at least one PUCCH resource set.

It should be noted that in some embodiments of the application, the second PUCCH resource set may be a subset of the first PUCCH resource set.

Further, in some embodiments of the application, when determining the second PUCCH resource set according to the initial PUCCH resource set and the at least one PUCCH resource set, the terminal may first extract part or all of PUCCH resources in the initial PUCCH resource set according to the second configuration information, and then determine the at least one PUCCH resource set and part or all of the PUCCH resources as the first PUCCH resource set.

It is understandable that, in some embodiments of the application, when extracting part or all of the PUCCH resources in the initial PUCCH resource set according to the second configuration information, the terminal may first determine the number of bits corresponding to the PUCCH resource indicator in the DCI according to the second configuration information, and then extract, according to the number of bits, part or all of the PUCCH resources from at least one set of PUCCH resources in sequence.

It should be noted that, in some embodiments of the application, whether the second PUCCH resource set includes partial PUCCH resources included in all of the at least one PUCCH resource set, or includes all the PUCCH resources included in all of the at least one PUCCH resource set, is determined by the terminal through the number of bits corresponding to the PUCCH resource indicator.

Further, in some embodiments of the application, if the second PUCCH resource set includes partial PUCCH resources included in all of the at least one PUCCH resource set, then these partial PUCCH resources are the previous PUCCH resources in each PUCCH resource set.

Exemplarily, the terminal may configure resource sets A, B, and C, where resource set A includes resource 1, resource 2, and resource 3, resource set B includes resource 4 and resource 5, and resource set C includes resource 6, resource 7, and resource 8. If the number of bits of the PUCCH resource indicator field in the DCI, which is configured by the second configuration information received by the terminal, is 1, that is, it may indicate a maximum of 2 resources, then the terminal configures, according to the second configuration information, the second PUCCH resource set as including resource 1 and resource 2 in resource set A, resource 4 and resource 5 in resource set B, and resource 6 and resource 7 in resource set C.

Further, in some embodiments of the application, when the terminal determines the first PUCCH resource set according to the initial PUCCH resource set and the at least one PUCCH resource set, it may directly determine the initial PUCCH resource set and the at least one PUCCH resource set as the first PUCCH resource set. In other words, the first PUCCH resource set configured by the terminal includes the at least one PUCCH resource set and the initial PUCCH resource set.

That is to say, in some embodiments of the application, for the joint configuration mode, the terminal may receive at least two PUCCH resource sets, for example, receive the first PUCCH resource set and the second PUCCH resource set, where the second PUCCH resource set is a subset of the first PUCCH resource set. Specifically, the terminal may first receive a set of PUCCH-Config. The PUCCH-Config includes at least one PUCCH resource set, with each PUCCH resource set including at least one PUCCH resource. Based on the above at least one PUCCH resource set, the second PUCCH resource set obtained by the terminal may include all of the at least one PUCCH resource set and all the PUCCH resources included in all of the at least one PUCCH resource set; and the first PUCCH resource set obtained by the terminal may include all of the at least one PUCCH resource set and part or all of the PUCCH resources included in all of at least one PUCCH resource set. It can be seen that after receiving the second configuration information, when the terminal may configure the second PUCCH resource set according to the second configuration information, since the second configuration information is used for configuring the number of bits of the PUCCH resource indicator field in the DCI, the terminal may configure the second PUCCH resource set to include part or all of the PUCCH resources in each PUCCH resource set according to the number of bits of the PUCCH resource indicator field.

The embodiments of the application provide a method for configuring a resource set, in which the terminal receives the first configuration information, and configures the first PUCCH resource set and the second PUCCH resource set according to the first configuration information. In other words, according to the embodiments of the application, the terminal is able to configure the first PUCCH resource set and the second PUCCH resource set based on the first configuration information as received, thereby achieving configuration of multiple resource sets based on supporting of the configurable size of PUCCH resource indicator proposed by the protocol. That is to say, based on the PUCCH resource indicator with the configurable size, the terminal is able to configure multiple PUCCH resource sets corresponding to different numbers of bits.

Figure 3:
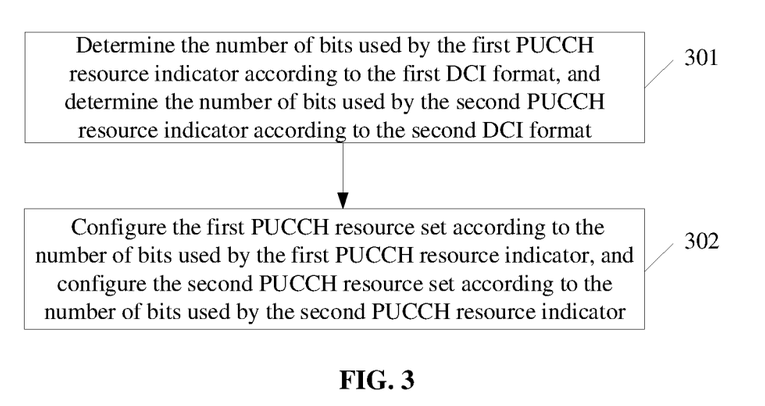
FIG. 3 is a third schematic diagram of the implementation process of the method for configuring resource set.

Based on the above-mentioned embodiments, in some other embodiments of the application, FIG. 3 is the third schematic diagram of the implementation process of the method for configuring resource set. As shown in FIG. 3, the terminal may configure the first PUCCH resource set and the second PUCCH resource set according to the first configuration information through the following steps.

In step 301, the number of bits used by the first PUCCH resource indicator is determined according to the first DCI format, and the number of bits used by the second PUCCH resource indicator is determined according to the second DCI format.

In some embodiments of the application, the terminal may first determine the number of bits used by the first PUCCH resource indicator according to the first DCI format, and at the same time, may determine the number of bits used by the second PUCCH resource indicator according to the second DCI format.

It should be noted that in some embodiments of the application, the first configuration information received by the terminal may include the first DCI format (the first sub-configuration information) and the second DCI format (the second sub-configuration information), where the first sub-configuration information is used for configuring at least one PUCCH resource set, and the second sub-configuration information is used for configuring at least one PUCCH resource set.

Further, in some embodiments of the application, after determining the first DCI format and the second DCI format, the terminal may determine the number of bits used by the corresponding first PUCCH resource indicator according to the first DCI format and determine the number of bits used by the corresponding second PUCCH resource indicator according to the second DCI format, respectively.

In step 302, the first PUCCH resource set is configured according to the number of bits used by the first PUCCH resource indicator, and the second PUCCH resource set is configured according to the number of bits used by the second PUCCH resource indicator.

In some embodiments of the application, after the terminal determines the number of bits used by the first PUCCH resource indicator according to the first DCI format, and determines the number of bits used by the second PUCCH resource indicator according to the second DCI format, the terminal may further configure the first PUCCH resource set according to the number of bits used by the first PUCCH resource the indicator, and at the same time, configure the second PUCCH resource set according to the number of bits used by the second PUCCH resource indicator.

It is understandable that, in some embodiments of the application, the first PUCCH resource set is obtained by the terminal based on the configuration of the number of bits used by the first PUCCH resource indicator, and the second PUCCH resource set is obtained by the terminal based on the configuration of the number of bits used by the second PUCCH resource indicator. Therefore, the terminal configures the first PUCCH resource set and the second PUCCH resource set separately without any fixed relationship therebetween.

Further, in some embodiments of the application, the first configuration information acquired by the terminal may include third sub-configuration information and fourth sub-configuration information, where the third sub-configuration information is used for configuring PUCCH resources in the first PUCCH resource set, the fourth sub-configuration information is used for configuring PUCCH resources in the second PUCCH resource set. Specifically, the first configuration information may include two independent resourceSetToAddModLists and resourceSetToReleaseLists. In other words, a first resourceSetToAddModList, a second resourceSetToAddModList, a first resourceSetToReleaseList, and a second resourceSetToReleaseList are determined; then the first PUCCH resource set may be configured according to the first resourceSetToAddModList and the first resourceSetToReleaseList, and at the same time, the second PUCCH resource set may be configured according to the second resourceSetToAddModLis and the second resourceSetToReleaseList.

Specifically, in some embodiments of the application, the terminal may configure two independent resourceSetToAddModLists and resourceSetToReleaseLists according to the PUCCH-Config included in the first configuration information. Optionally, the first resource SetToAddModList, the second resource SetToAddModList, the first resourceSetToReleaseList, and the second resourceSetToReleaseList may be configured in the same PUCCH-Config signaling, or configured in two different PUCCH-Config signalings. The application is not specifically limited thereto.

It is understandable that, in some embodiments of the application, the first PUCCH resource set is obtained and configured by the terminal based on the first resourceSetToAddModList and the first resourceToReleaseList, and the second PUCCH resource set is obtained and configured by the terminal based on the second resourceSetToAddModList and the second resourceSetToReleaseList. Therefore, the terminal configures the first PUCCH resource set and the second PUCCH resource set separately without any fixed relationship therebetween.

Further, in some embodiments of the application, the first configuration information acquired by the terminal may include third sub-configuration information and fourth sub-configuration information, where the third sub-configuration information is used for configuring PUCCH resources in the first PUCCH resource set, and the fourth sub-configuration information is used for configuring PUCCH resources in the second PUCCH resource set. Specifically, the first configuration information may also include two independent resourceToAddModLists and resourceToReleaseLists. In other words, a first resourceToAddModList, a second resourceToAddModList, a first resourceToReleaseList, and a second resourceToReleaseList are determined. Then, the first resourceToAddModList and the first resourceToReleaseList may be used for configuring the first PUCCH resource set, and at the same time, the second resourceToAddModList and the second resourceToReleaseList may be used for configuring the second PUCCH resource set.

Specifically, in some embodiments of the application, the terminal may configure two independent resourceToAddModLists and resourceToReleaseLists according to the PUCCH-Config included in the first configuration information. Optionally, the first resourceToAddModList, the second resourceToAddModList, the first resourceToReleaseList, and the second resourceToReleaseList may be configured in the same PUCCH-Config signaling, or configured in two different PUCCH-Config signalings. The application is not specifically limited thereto.

It is understandable that, in some embodiments of the application, the first PUCCH resource set is obtained and configured by the terminal based on the first resourceToAddModList and the first resourceToReleaseList, and the second PUCCH resource set is obtained and configured by the terminal based on the second resourceToAddModList and the second resourceToReleaseList. Therefore, the terminal configures the first PUCCH resource set and the second PUCCH resource set separately, without any fixed relationship therebetween.

That is to say, in some embodiments of the application, for the independent configuration mode, the terminal may receive the first DCI format (first sub-configuration information) and the second DCI format (second sub-configuration information), and then configure the first PUCCH resource set according to the number of bits used by the first PUCCH resource indicator of the first DCI format, and configure the second PUCCH resource set according to the number of bits used by the second PUCCH resource indicator of the second DCI format. Further, when the terminal independently configures the first PUCCH resource set and the second PUCCH resource set, it may configure two independent resourceSetToAddModLists/resourceSetToReleaseLists or two independent resourceToAddModLists/resourceToReleaseLists, that is, the third sub-configuration information and the fourth sub-configuration information which are then further configured as the first PUCCH resource set and the second PUCCH resource set.

Figure 4:
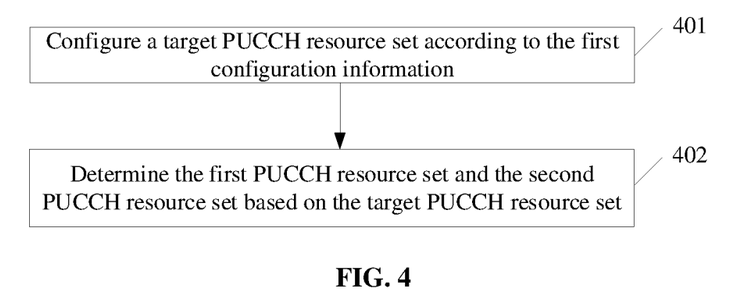
FIG. 4 is a fourth schematic diagram of the implementation process of the method for configuring resource set.

In some embodiments of the application, further, FIG. 4 is the fourth schematic diagram of the implementation process of the method for configuring resource set. As shown in FIG. 4, the terminal may configure the first PUCCH resource set and the second PUCCH resource set according to the first configuration information through the following steps.

In step 401, a target PUCCH resource set is configured according to the first configuration information.

In some embodiments of the application, after obtaining the first configuration information, the terminal may first configure the target PUCCH resource set according to the first configuration information.

It should be noted that in some embodiments of the application, the target PUCCH resource set is used for configuring the first PUCCH resource set and the second PUCCH resource set.

It is understandable that, in some embodiments of the application, the terminal may first obtain an original PUCCH resource set based on the first configuration information configuration, that is, the target PUCCH resource set, and then configure multiple independent resource sets based on the target PUCCH resource set.

In step 402, the first PUCCH resource set and the second PUCCH resource set are determined based on the target PUCCH resource set.

In some embodiments of the application, after configuring the target PUCCH resource set according to the first configuration information, the terminal may further determine the first PUCCH resource set and the second PUCCH resource set through the target PUCCH resource set.

Further, in some embodiments of the application, when the terminal independently configures the first PUCCH resource set and the second PUCCH resource set based on the target PUCCH resource set, it may first determine a first bit value corresponding to the first DCI format, and a second bit value corresponding to the second DCI format. Then, the first PUCCH resource set and the second PUCCH resource set may be further determined according to the first bit value, the second bit value, and the target PUCCH resource set.

Exemplary, the terminal obtains the first bit value m and the second bit value n, then the terminal may configure the first to $2^n$-th PUCCH resources in each PUCCH resource set of the target PUCCH resource set as the first PUCCH resource set and, at the same time, configure the $2^{(n+1)}$-th to $2^{(n+m)}$-th PUCCH resources in each PUCCH resource set of the target PUCCH resource set as the second PUCCH resource set. Herein, both m and n are positive integers.

It can be seen that, in some embodiments of the application, the first PUCCH resource set and the second PUCCH resource set are configured independently by the terminal through different manners on the basis of the target PUCCH resource set, without any fixed relationship therebetween.

That is to say, in some embodiments of the application, for the independent configuration mode, the terminal may also configure a target PUCCH resource set, and then configure the first PUCCH resource set and the second PUCCH resource set based on different elements in the target PUCCH resource set.

For example, the first PUCCH resource set corresponds to the first to $2^n$-th PUCCH resources in each PUCCH resource set of the target PUCCH resource set; and the second PUCCH resource set corresponds to the $2^{(n+1)}$-th to $2^{(n+m)}$-th PUCCH resources in each PUCCH resource set of the target PUCCH resource set.

The embodiments of the application provide a method for configuring a resource set, in which the terminal receives the first configuration information, and configures the first PUCCH resource set and the second PUCCH resource set according to the first configuration information. In other words, according to the embodiments of the application, the terminal is able to configure the first PUCCH resource set and the second PUCCH resource based on the first configuration information as received, thereby achieving configuration of multiple resource sets based on supporting of the configurable size of PUCCH resource indicator proposed by the protocol. That is to say, based on the PUCCH resource indicator with the configurable size, the terminal is able to configure multiple PUCCH resource sets corresponding to different numbers of bits.

Some embodiments of the application provides a method for configuring resource set, which is applied to a network device. When the network device configures the resource set, it may send the first configuration information to the terminal, thereby causing the terminal to configure the first PUCCH resource set and the second PUCCH resource set according to the first configuration information.

It should be noted that, in some embodiments of the application, the first configuration information is used for configuring at least one PUCCH resource set, with each PUCCH resource set including at least one PUCCH resource.

Further, in some embodiments of the application, when configuring the resource set, the network device may also send second configuration information to the terminal; where the second configuration information is used for configuring the number of bits of the PUCCH resource indicator field in the DCI.

It should be noted that in some embodiments of the application, the first configuration information may include first sub-configuration information and second sub-configuration information, where the first sub-configuration information is used for configuring at least one PUCCH resource set, and the second sub-configuration information is used for configuring at least one PUCCH resource set.

Further, in some embodiments of the application, the first configuration information may also include third sub-configuration information and fourth sub-configuration information, where the third sub-configuration information is used for configuring PUCCH resources in the first PUCCH resource set, and the fourth sub-configuration information is used for configuring PUCCH resources in the second PUCCH resource set.

The embodiments of the application provide a method for configuring a resource set, in which the network device sends the first configuration information to the terminal, thereby causing the terminal to configure the first PUCCH resource set and the second PUCCH resource set according to the first configuration information. In other words, according to the embodiments of the application, the first configuration information sent by the network device to the terminal can be used for configuring the first PUCCH resource set and the second PUCCH resource, thereby achieving configuration of multiple resource sets based on supporting of the configurable size of PUCCH resource indicator proposed by the protocol. That is to say, based on the PUCCH resource indicator with the configurable size, multiple PUCCH resource sets can be configured corresponding to different numbers of bits.

Figure 5:
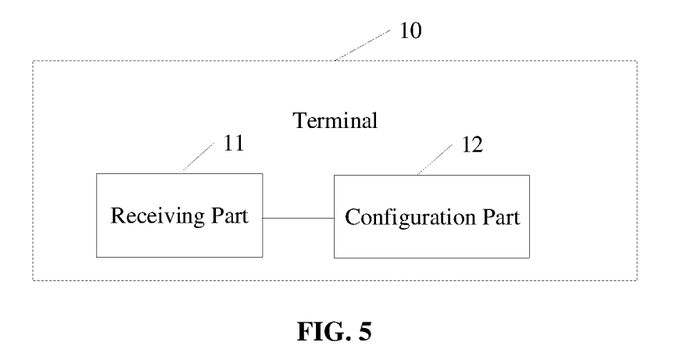
FIG. 5 is a first block diagram of the terminal.

Based on the foregoing embodiments, in some other embodiment of the application, FIG. 5 is the first block diagram of the terminal. As shown in FIG. 5, the terminal 10 according to some embodiments of the application may include a receiving part 11 and a configuration part 12.

The receiving part 11 is configured to receive the first configuration information.

The configuration part 12 is configured to configure the first PUCCH resource set and the second PUCCH resource set according to the first configuration information.

Figure 6:
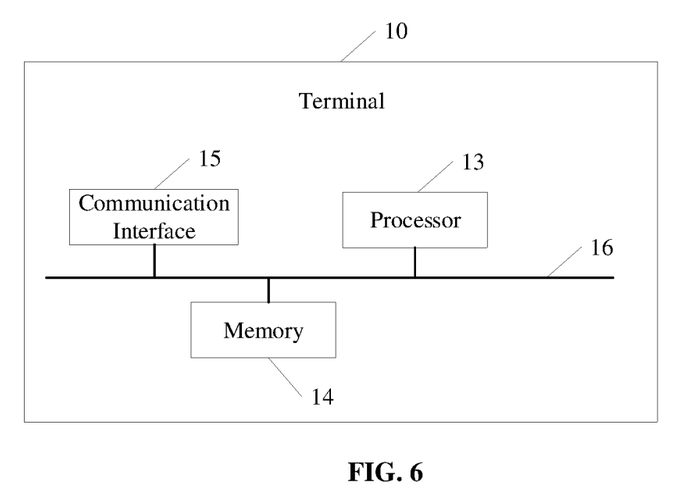
FIG. 6 is a second block diagram of the terminal.

In some embodiments of the application, further, FIG. 6 is a second block diagram of the terminal. As shown in FIG. 6, the terminal 10 according to some embodiments of the application may include a processor 13 and a memory 14 storing instructions executable by the processor 13. Further, the terminal 10 may further include a communication interface 15 and a bus 16 for connecting the processor 13, the memory 14 and the communication interface 15.

In some embodiments of the application, the above-mentioned processor 13 may include at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor. It may be understood that, for different devices, the electronic devices used to implement the above-mentioned functions of processor may also be other, which is not specifically limited in the embodiments of the application. The terminal 10 may further include the memory 14, which may be connected to the processor 13, wherein the memory 14 is configured to store executable program codes which include computer operation instructions. The memory 14 may include high-speed RAM memory, or may also include a non-volatile memory, for example, at least two disk memories.

In some embodiments of the application, the bus 16 is used for connection and mutual communication of the communication interface 15, the processor 13 and the memory 14.

In some embodiments of the application, the memory 14 is configured to store instructions and data.

Further, in some embodiments of the application, the aforementioned processor 13 is configured to receive the first configuration information; and configure the first PUCCH resource set and the second PUCCH resource set according to the first configuration information.

In practical applications, the aforementioned memory 14 may be a volatile memory, such as a random-access memory (RAM); or a non-volatile memory, such as a read-only memory (ROM), flash memory, hard disk drive (HDD) or solid-state drive (SSD); or a combination of the above types of memory, and provide the processor 13 with instructions and data.

In addition, the functional modules in the embodiments may be integrated into one processing unit, or each unit may exist alone physically, or two or more units may be integrated into one unit. The above-mentioned integrated unit may be realized in the form of hardware or software function module.

If the integrated unit is implemented in the form of a software function module and is not sold or used as an independent product, it may be stored in a computer readable storage medium. Based on this understanding, essential part of the technical solution of the embodiments, or the part thereof contributing to the prior art, or a part or all of the technical solution, may be embodied in the form of a software product. The computer software product is stored in a storage medium and includes several instructions to enable a computer device (which may be a personal computer, a server, or a network device, and the like) or a processor to execute all or part of the steps of the method in the embodiments. The aforementioned storage medium includes U disk, mobile hard disk, ROM, RAM, magnetic disk or optical disk and other medium that may store program codes.

The embodiments of the application provide a terminal, which receives the first configuration information, and configures the first PUCCH resource set and the second PUCCH resource set according to the first configuration information. In other words, according to the embodiments of the application, the terminal is able to configure the first PUCCH resource set and the second PUCCH resource based on the first configuration information as received, thereby achieving configuration of multiple resource sets based on supporting of the configurable size of PUCCH resource indicator proposed by the protocol. That is to say, based on the PUCCH resource indicator with the configurable size, the terminal is able to configure multiple PUCCH resource sets corresponding to different numbers of bits.

Figure 7:
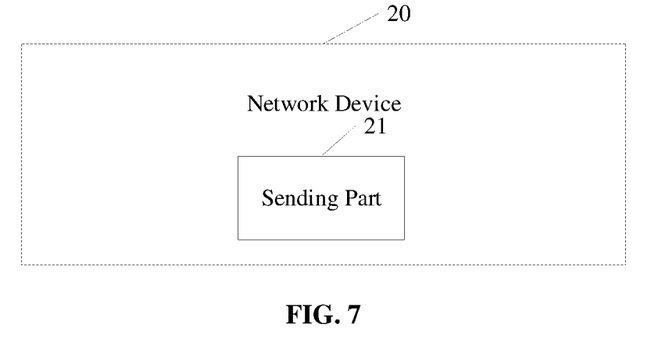
FIG. 7 is a block diagram of the network device.

Based on the foregoing embodiments, in some other embodiments of the application, FIG. 7 is a block diagram of a network device. As shown in FIG. 7, the network device 20 according to some embodiments of the application may include a sending part 21.

The sending part 21 is configured to send the first configuration information to the terminal, thereby causing the terminal to configure the first PUCCH resource set and the second PUCCH resource set according to the first configuration information.

In some embodiments of the application, further, the network device may also include a processor and a memory storing instructions executable by the processor. Further, the network device may also include a communication interface and a bus configured to connect the processor, the memory, and communicate with each other.

Further, in some embodiments of the application, the above-mentioned processor is configured to send the first configuration information to the terminal, thereby causing the terminal to configure the first PUCCH resource set and the second PUCCH resource set according to the first configuration information.

The embodiments of the application provide a network device, which sends the first configuration information to the terminal, thereby causing the terminal to configure the first PUCCH resource set and the second PUCCH resource set according to the first configuration information. In other words, according to the embodiments of the application, the first configuration information sent from the network device to the terminal can be used for configuring the first PUCCH resource set and the second PUCCH resource, thereby achieving configuration of multiple resource sets based on supporting of the configurable size of PUCCH resource indicator proposed by the protocol. That is to say, based on the PUCCH resource indicator with the configurable size, the terminal is able to configure multiple PUCCH resource sets corresponding to different numbers of bits.

Some embodiments of the application provide a computer-readable storage medium with a program stored thereon, and the program is used for, when being executed by a processor, implementing the above-mentioned method for configuring resource set.

Specifically, the program instructions corresponding to the method for configuring resource set in the embodiments may be stored on storage medium such as optical disks, hard disks, and USB flash drives. When the program instructions in the storage medium corresponding to the method for configuring resource set are read or executed by the terminal, the following steps are included:
receiving the first configuration information; and
configuring the first PUCCH resource set and the second PUCCH resource set according to the first configuration information.

When the program instructions in the storage medium corresponding to the method for configuring resource set are read or executed by the network device, the following steps are included:
sending the first configuration information to the terminal, thereby causing the terminal to configure the first PUCCH resource set and the second PUCCH resource set according to the first configuration information.

Those skilled in the art should understand that the embodiments of the application may be provided as methods, systems, or computer program products. Therefore, the application may adopt the form of hardware embodiments, software embodiments, or a combination of software and hardware embodiments. Moreover, the application may adopt the form of a computer program product implemented on one or more computer-usable storage medium (including but not limited to disk storage, optical storage, and the like) containing computer-usable program codes.

The application is described with reference to the schematic diagrams and/or block diagrams of the implementation process of the methods, equipment (systems), and computer program products according to the embodiments of the application. It should be understood that each process and/or block in the schematic flow diagram and/or block diagram, and a combination of processes and/or blocks in the schematic flow diagram and/or block diagram may be implemented by computer program instructions. These computer program instructions may be provided to the processor of a general-purpose computer, a special-purpose computer, an embedded processor, or other programmable data processing equipment to generate a machine, so that the instructions executed by the processor of the computer or other programmable data processing equipment are generated the device for implementing functions specified in one process or multiple processes in the schematic flow chart and/or one or more blocks in the block diagram.

These computer program instructions may also be stored in a computer-readable memory that may guide a computer or other programmable data processing equipment to work in a specific manner, so that the instructions stored in the computer-readable memory produce an article of manufacture including the instruction device. The instruction device is configured to realize the functions specified in one or more processes in the schematic diagram and/or one or more blocks in the block diagram.

These computer program instructions may also be loaded on a computer or other programmable data processing equipment, so that a series of operation steps are executed on the computer or other programmable equipment to produce computer-implemented processing, thereby implementing, through the instructions executed on the computer or other programmable equipment, steps for achieving functions specified in one or more processes in the schematic diagram and/or one or more blocks in the block diagram.

The above are only some preferred embodiments of the application, but the protection scope of this application is not limited thereto. Any changes or substitutions easily conceived by those skilled in the art within the technical scope disclosed in this application should fall within the protection scope of this application. Therefore, the protection scope of this application should be subject to the protection scope of the claims.

INDUSTRIAL APPLICABILITY

The embodiments of the application provide a method, a terminal, a network device and a storage medium for configuring a resource set, in which the terminal receives the first configuration information, and configures the first PUCCH resource set and the second PUCCH resource set according to the first configuration information. In other words, according to the embodiments of the application, the terminal is able to configure the first PUCCH resource set and the second PUCCH resource based on the first configuration information as received, thereby achieving configuration of multiple resource sets based on supporting of the configurable size of PUCCH resource indicator proposed by the protocol. That is to say, based on the PUCCH resource indicator with the configurable size, the terminal is able to configure multiple PUCCH resource sets corresponding to different numbers of bits.

What is claimed is:

1. A method for configuring a resource set, wherein the method is applied to a terminal and comprises:
receiving first configuration information, wherein the first configuration information is used for configuring at least one PUCCH resource set, with each PUCCH resource set comprising at least one PUCCH resource; and
configuring a first PUCCH resource set and a second PUCCH resource set according to the first configuration information,
wherein the configuring the first PUCCH resource set and the second PUCCH resource set according to the first configuration information comprises:
configuring the first PUCCH resource set as comprising all PUCCH resources in the each PUCCH resource set of the at least one PUCCH resource set; and
configuring the second PUCCH resource set as comprising part or all of the PUCCH resources in the each PUCCH resource set,
wherein the method further comprises:
receiving second configuration information, wherein the second configuration information is used for configuring a number of bits of a PUCCH resource indicator field in a downlink control information (DCI); and
wherein the configuring the second PUCCH resource set as comprising part or all of the PUCCH resources in the each PUCCH resource set comprises:
configuring, according to the number of bits of the PUCCH resource indicator field, the second PUCCH resource set as comprising part or all of the PUCCH resources in the each PUCCH resource set.

2. The method as claimed in claim 1, wherein the configuring the first PUCCH resource set and the second PUCCH resource set according to the first configuration information further comprises:
configuring the first PUCCH resource set as comprising N PUCCH resources in the each PUCCH resource set of the at least one PUCCH resource set, where N is a positive integer; and
configuring the second PUCCH resource set as comprising PUCCH resources other than the N PUCCH resources in the each PUCCH resource set.

3. The method as claimed in claim 2, wherein the N is determined based on the number of bits of the PUCCH resource indicator field in the DCI.

4. The method as claimed in claim 1, wherein the first configuration information comprises first sub-configuration information and second sub-configuration information; the first sub-configuration information is used for configuring at least one PUCCH resource set, and the second sub-configuration information is used for configuring at least one PUCCH resource set.

5. The method as claimed in claim 4, wherein the configuring the first PUCCH resource set and the second PUCCH resource set according to the first configuration information comprises:
configuring the first PUCCH resource set as comprising all PUCCH resources in the at least one PUCCH resource set configured by the first sub-configuration information; and
configuring the second PUCCH resource set as comprising all PUCCH resources in the at least one PUCCH resource set configured by the second sub-configuration information.

6. The method as claimed in claim 1, wherein the first configuration information comprises third sub-configuration information and fourth sub-configuration information; the third sub-configuration information is used for configuring a PUCCH resource in the first PUCCH resource set, and the fourth sub-configuration information is used for configuring a PUCCH resource in the second PUCCH resource set.

7. A terminal, comprising a processor and a memory storing instructions executable by the processor, wherein the instructions are used for, when being executed by the processor, implementing steps of:
receiving first configuration information, wherein the first configuration information is used for configuring at least one PUCCH resource set, with each PUCCH resource set comprising at least one PUCCH resource; and
configuring a first PUCCH resource set and a second PUCCH resource set according to the first configuration information,
wherein the configuring the first PUCCH resource set and the second PUCCH resource set according to the first configuration information comprises:

configuring the first PUCCH resource set as comprising all PUCCH resources in the each PUCCH resource set of the at least one PUCCH resource set; and configuring the second PUCCH resource set as comprising part or all of the PUCCH resources in the each PUCCH resource set, wherein the instructions are further used for implementing a step of:

receiving second configuration information, wherein the second configuration information is used for configuring a number of bits of a PUCCH resource indicator field in a downlink control information (DCI); and wherein the configuring the second PUCCH resource set as comprising part or all of the PUCCH resources in the each PUCCH resource set comprises:

configuring, according to the number of bits of the PUCCH resource indicator field, the second PUCCH resource set as comprising part or all of the PUCCH resources in the each PUCCH resource set.

8. The terminal as claimed in claim 7, wherein the configuring the first PUCCH resource set and the second PUCCH resource set according to the first configuration information comprises:

configuring the first PUCCH resource set as comprising N PUCCH resources in the each PUCCH resource set of the at least one PUCCH resource set, where N is a positive integer; and configuring the second PUCCH resource set as comprising PUCCH resources other than the N PUCCH resources in the each PUCCH resource set.

9. A network device, comprising a processor and a memory storing instructions executable by the processor, wherein the instructions are used for, when being executed by the processor, implementing a step of:

sending first configuration information to a terminal, causing the terminal to configure a first PUCCH resource set and a second PUCCH resource set according to the first configuration information, wherein the first configuration information is used for configuring at least one PUCCH resource set, with each PUCCH resource set comprising at least one PUCCH resource; and wherein the instructions are further used for implementing a step of:

sending second configuration information to the terminal, wherein the second configuration information is used for configuring a number of bits of a PUCCH resource indicator field in a downlink control information (DCI).

10. The network device as claimed in claim 9, wherein the first configuration information comprises first sub-configuration information and second sub-configuration information; the first sub-configuration information is used for configuring at least one PUCCH resource set, and the second sub-configuration information is used for configuring at least one PUCCH resource set.

11. The network device as claimed in claim 9, wherein the first configuration information comprises third sub-configuration information and fourth sub-configuration information; the third sub-configuration information is used for configuring a PUCCH resource in the first PUCCH resource set, and the fourth sub-configuration information is used for configuring a PUCCH resource in the second PUCCH resource set.

* * * * *